(12) United States Patent
Laible

(10) Patent No.: US 9,296,000 B1
(45) Date of Patent: Mar. 29, 2016

(54) HAND-HELD DISPENSER WITH BACKFLOW PREVENTER

(71) Applicant: Rodney Laible, Omaha, NE (US)

(72) Inventor: Rodney Laible, Omaha, NE (US)

( * ) Notice: Subject to any disclaimer, the term of this patent is extended or adjusted under 35 U.S.C. 154(b) by 13 days.

(21) Appl. No.: 14/504,874

(22) Filed: Oct. 2, 2014

(51) Int. Cl.
*B05B 7/04* (2006.01)
*B05B 7/24* (2006.01)
*A01C 15/02* (2006.01)
*A01M 7/00* (2006.01)
*A01N 25/00* (2006.01)

(52) U.S. Cl.
CPC .............. *B05B 7/2443* (2013.01); *A01C 15/02* (2013.01); *A01M 7/0046* (2013.01); *A01N 25/00* (2013.01); *B05B 7/0408* (2013.01)

(58) Field of Classification Search
CPC .. B05B 7/0408; B05B 7/2424; B05B 7/2443; B05B 7/30
See application file for complete search history.

(56) References Cited

U.S. PATENT DOCUMENTS

| | | | | |
|---|---|---|---|---|
| 2,388,445 | A * | 11/1945 | Stewart | B05B 7/12 239/318 |
| 6,988,675 | B2 * | 1/2006 | Hubmann | B01F 5/0413 239/302 |
| 7,237,728 | B1 * | 7/2007 | Laible | A62C 13/76 239/310 |
| 7,296,761 | B1 | 11/2007 | Laible | |
| 8,069,878 | B2 * | 12/2011 | Laible | A01C 23/042 137/892 |
| 8,177,143 | B2 * | 5/2012 | Laible | B05B 7/1209 239/310 |
| 8,726,939 | B2 | 5/2014 | Laible | |

* cited by examiner

*Primary Examiner* — Ryan Reis
(74) *Attorney, Agent, or Firm* — Dennis L. Thomte; Thomte Patent Law Office LLC

(57) ABSTRACT

A hand-held dispenser is provided for controlling the flow of water therethrough and for injecting a liquid chemical into the water passing through the apparatus. The dispenser also includes an air-gap backflow preventer which prevents the water source being contaminated should the dispenser be subjected to a backflow problem.

4 Claims, 8 Drawing Sheets

HAND-HELD DISPENSER WITH BACKFLOW PREVENTER

BACKGROUND OF THE INVENTION

1. Field of the Invention

This invention relates to a hand-held dispenser and more particularly to a hand-held dispenser for mixing water passing therethrough with a liquid chemical. Further, this invention relates to a hand-held dispenser which includes a backflow preventer should the dispenser be subjected to a backflow problem.

2. Description of the Related Art

Many types of dispensers have been previously provided which may be connected to the end of a water hose or the like wherein the dispenser introduces chemicals into the water flow so that a lawn or the like may be sprayed. Further, the dispensers of the prior art are also able to inject liquid chemicals into a water stream so that a mop bucket, etc., may be filled with water, detergent or other chemicals. In Applicant's earlier U.S. Pat. Nos. 7,237,728; 7,296,761; and 8,177,143 hand-held dispensers are disclosed which are able to conveniently and economically precisely control the rate of waterflow through the dispenser and to precisely control the metering of liquid chemicals in the precisely controlled flow of water.

Although the dispensers of Applicant's earlier patents have met with considerable success, Applicant has developed an improved hand-held dispenser which is convenient to use and which includes a backflow preventer which prevents the source of water from being contaminated should the dispenser be subjected to a backflow problem.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A hand-held dispenser is described for controlling the flow of water therethrough so that a liquid chemical or the like may be mixed with the water passing therethrough. The dispenser of this invention comprises a generally horizontally disposed first body portion having an inlet end and a discharge end, and a generally vertically disposed second body portion, having upper and lower ends, extending downwardly from the first body portion. The first body portion comprises a pair of body portions which are secured together. The lower end of the second body portion is configured to be secured to a liquid chemical container.

The first body portion includes a generally horizontally disposed first body member which extends from the inlet end of the first body portion towards the discharge end thereof. The first body member has an inlet end and a discharge end. The first body member has a horizontally disposed first fluid passageway formed therein which extends from the inlet end thereof towards the discharge end thereof. The first fluid passageway has an inlet end and a discharge end. The inlet end of the first fluid passageway is adapted to be placed in communication with a source of water under pressure. The first body portion has a generally vertically disposed second body member positioned at the discharge end thereof with the second body member having upper and lower ends. The second body member has a cylindrical chamber formed therein which has an inlet end and a discharge end. The second body member has an annular first valve seat provided in the chamber thereof above the inlet end thereof. The first valve seat has an inlet side and a discharge side. The inlet side of the first valve seat is in communication with the first passageway of the first body member. The discharge side of the first valve seat is in communication with the chamber. A first valve is selectively vertically movably mounted in the chamber. The first valve includes a valve member positioned below the valve seat and a valve stem, having upper and lower ends, secured to the valve member which extends upwardly therefrom through the valve seat and the chamber. The first valve is selectively vertically movable between a lower position to an upper position. The valve member of the first valve closes the first valve seat when the first valve is in its upper position. The valve member of the first valve, when the first valve is in its lower position, permitting the flow of water from the first passageway through the first valve seat and upwardly into the chamber. A valve actuating lever is pivotally secured to the first body portion which is operatively connected to the upper end of the valve stem of the first valve. The valve actuating lever is pivotally movable from an upper "off" position wherein said first valve is in its upper position to a lower "on" position wherein the valve member of the first valve is unseated from the first valve seat.

The first body portion has a horizontally disposed second passageway, having inlet and discharge ends, formed therein which extends from the chamber, above the valve seat, towards the discharge end of the first body portion. The first body portion also includes a horizontally disposed third body member, having inlet and discharge ends, extending from the second body member towards the discharge end of the first body portion. The inlet end of the third body member is in fluid communication with the second passageway.

The first body portion also includes a fourth body member having an inlet end and a discharge end. The discharge end of the third body member is received by the inlet end of the fourth body member. The fourth body member has a tapered second valve seat formed therein which is spaced from the discharge end of the fourth body member. The fourth body member has a backflow exhaust opening formed therein adjacent the discharge end thereof which is in communication with the atmosphere.

A shuttle valve is provided having an inlet end and a discharge end and a tapered valve at its discharge end. The shuttle valve has a first passageway formed therein which has an inlet end and a discharge end. The tapered valve has a central opening extending therethrough which is in communication with the first passageway thereof. A normally closed flexible duck-bill valve or flap valve is provided having an inlet end and a discharge end. The duck-bill valve is positioned in the first passageway of the shuttle valve. The discharge end of the duck-bill valve is in communication with the central opening in the tapered valve. The shuttle valve is movably positioned in the third and fourth body members. The shuttle valve is movable between extended and retracted positions relative to the third and fourth body members. A spring is mounted in the fourth body member which yieldably urges the shuttle valve to its retracted position. The tapered valve, when the shuttle valve is in its extended position, seats into the second valve seat of the fourth body member whereby water passing from the discharge end of the duck-bill valve will pass through the discharge end of the fourth body member. The tapered valve, when the shuttle valve is in its retracted position, which is caused by the spring and/or backflow pressure, is unseated from the second valve seat whereby the interior of the fourth body member is in communication with the atmosphere by way of the backflow opening in the fourth body member.

The first body portion has a discharge passageway formed therein which extends from the discharge end of the second valve seat to the discharge end of the first body portion. The second body portion has a suction passageway, having upper and lower ends, extending upwardly therethrough. The lower end of the suction passageway is in communication with the interior of the chemical container. The upper end of the suction passageway is in communication with the discharge passageway of the first body portion whereby water passing through the discharge passageway will draw liquid from the container by way of the suction passageway into the water being discharged from the dispenser.

When it is desired to mix liquid chemical to the water being discharged from the dispenser, a chemical container is secured to the connector at the lower end of the second body portion. Prior to the actuating lever being moved from its upper "off" position, to its lower "on" position, the spring will yieldably urge the shuttle valve to its retracted position. With the shuttle valve being in the retracted position, and the actuating lever being in the "off" position, the duck-bill will be closed and the discharge tube at the discharge end of the dispenser will be in communication with the atmosphere by way of the slot or opening in the fourth body member.

When the actuating lever is pivotally moved from its "off" position to its "on" position, the pressurized water will open the discharge end of the duck-bill valve and will move the shuttle valve to its extended position against the yieldable force of the spring whereby the valve thereof will seat upon the valve seat in the fourth body member so that the water will flow therethrough. As the water passes the upper end of the suction passageway in the second body portion, a venturi will be created to draw the liquid chemical in the liquid container into the dispenser. Should the discharge end of the dispenser be subjected to a backflow problem, the spring in the fourth body member will move the shuttle valve from its extended position and the duck-bill valve will be closed so to its retracted position so that the backflow will be exhausted to the atmosphere by way of the slot or opening formed in the fourth body member. If the source of water should be interrupted by a water line break, a suction is created at the inlet end of the shuttle valve which will cause the shuttle valve to move to its retracted position. One suction will also cause the duck-bill valve to close. The spring also urges the shuttle valve to move to its retracted position. Thus, even if the spring should fail, the suction will move the shuttle valve to its retracted position and the duck-bill valve will be closed. Therefore, any chemical in the discharge end of the first body portion will be exhausted the same to the atmosphere.

It is therefore a principal object of the invention to provide an improved hand-held dispenser having a backflow preventer incorporated therein.

A further object of the invention is to provide an improved hand-held dispenser which will prevent the source of water being supplied to the dispenser from being contaminated if the inlet end of the dispenser or the discharge end of the dispenser is subjected to a backflow problem.

Yet another object of the invention is to provide an improved hand-held dispenser which includes a shuttle valve with a duck-bill valve therein which closes a backflow exhaust opening when the shuttle valve is in an extended position and which opens the backflow exhaust opening when in a retracted position.

A modified form of the invention is also disclosed in FIGS. 7 and 8 wherein a spool valve is imposed in the first body portion to provide a means for varying the flow of water therethrough.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
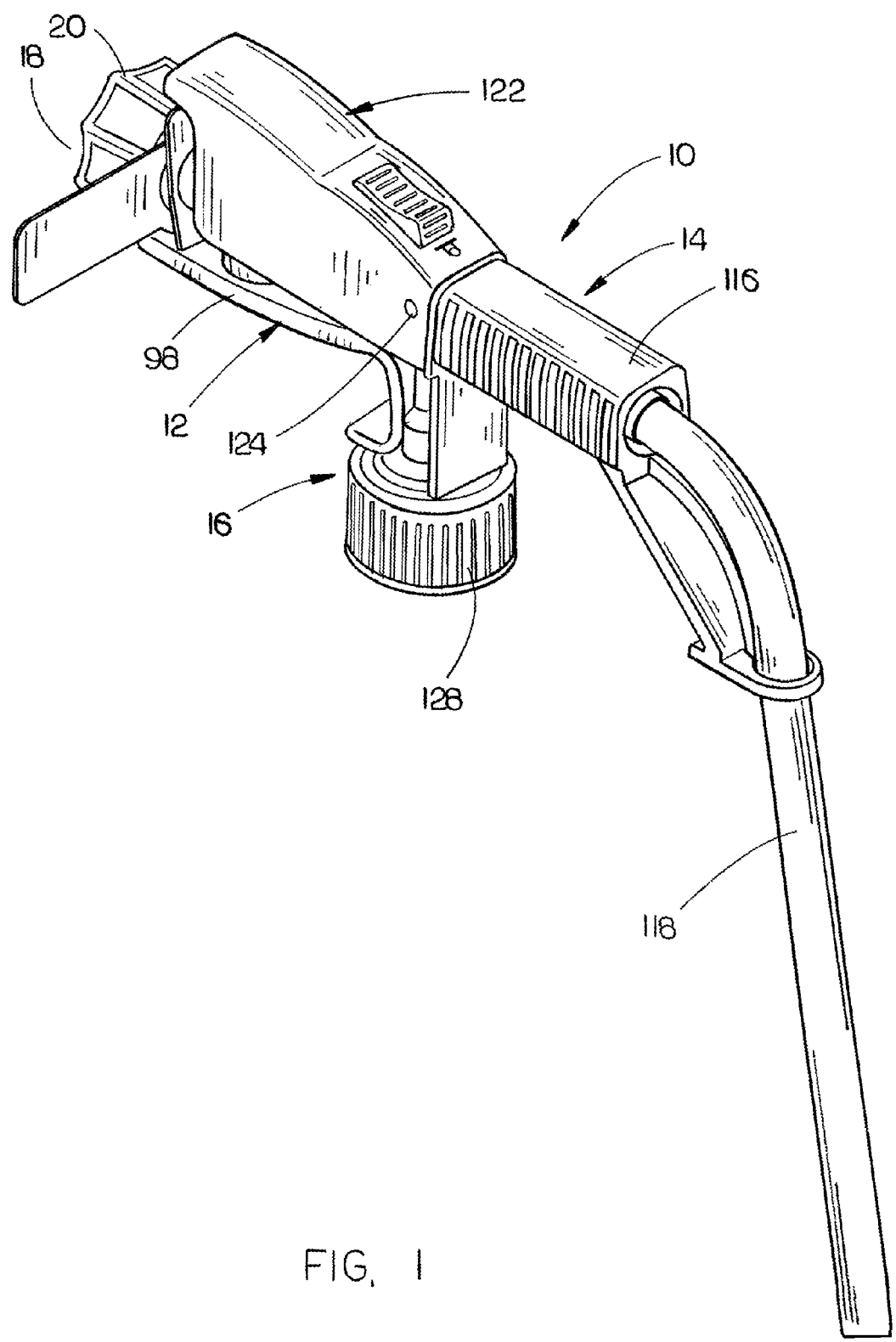
FIG. 1 is a perspective view of the hand-held dispenser of this invention.
Figure 2:
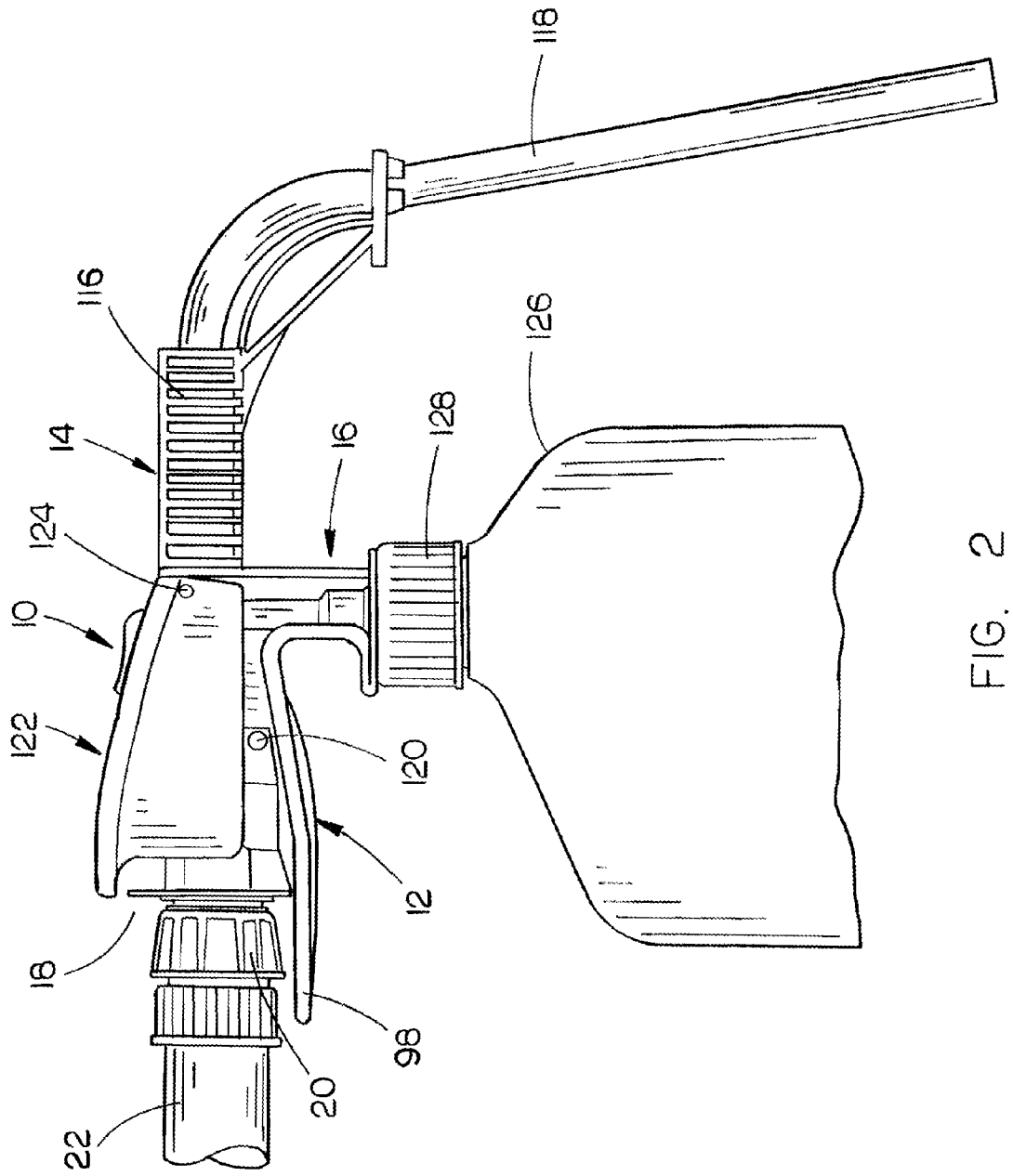
FIG. 2 is a side view of the hand-held dispenser of this invention.
Figure 3:
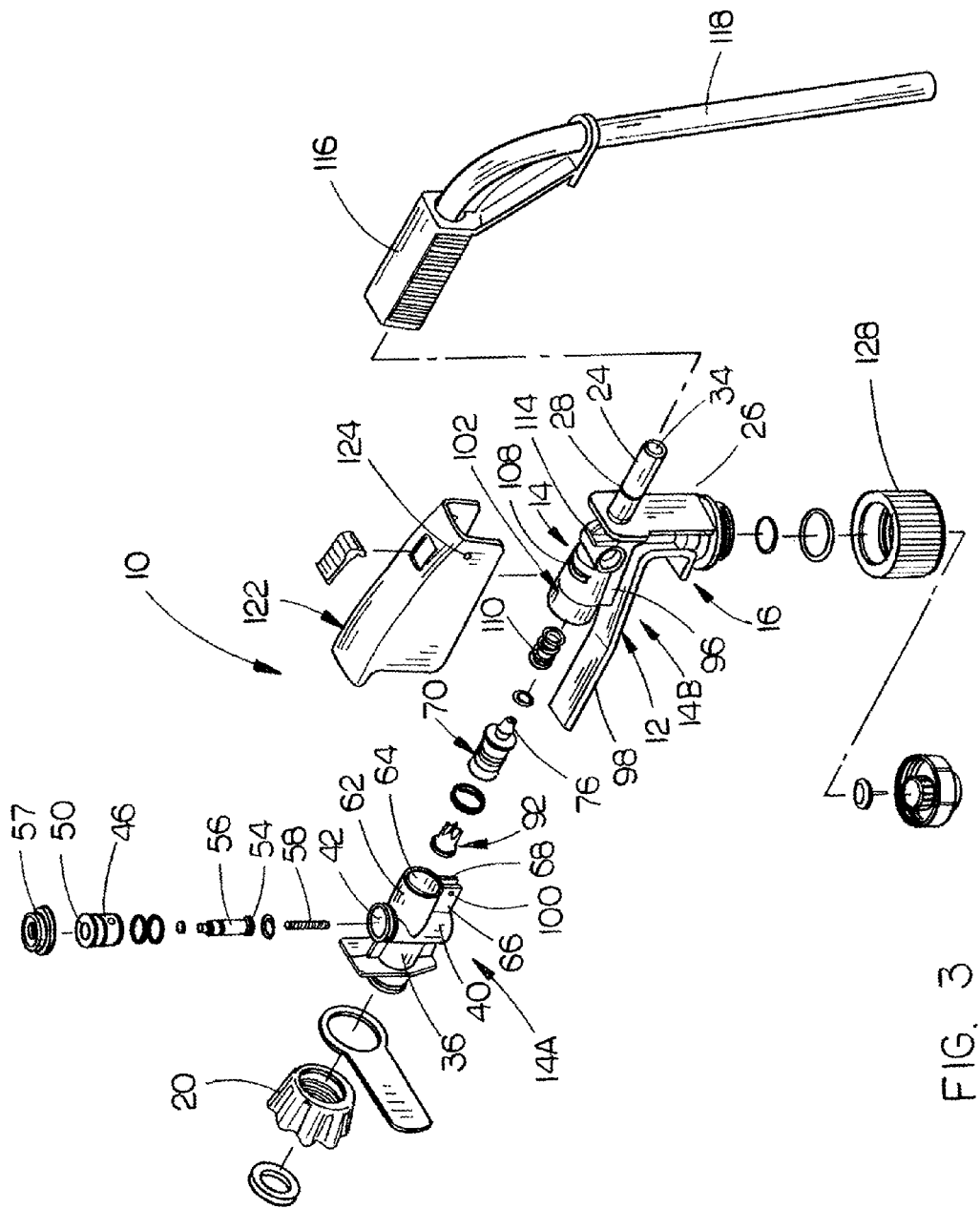
FIG. 3 is an exploded perspective view of the hand-held dispenser of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The hand-held dispenser of this invention, as seen in FIGS. 1-6, is referred to generally by the reference numeral 10 and includes a dispenser body 12 which is generally T-shaped in configuration and which includes a generally horizontally disposed body portion 14 and a generally vertically disposed body portion 16. Obviously, body portion 14 will not always be horizontally disposed when being used nor will body portion 16 always be substantially vertically disposed when in use.

Figure 4:
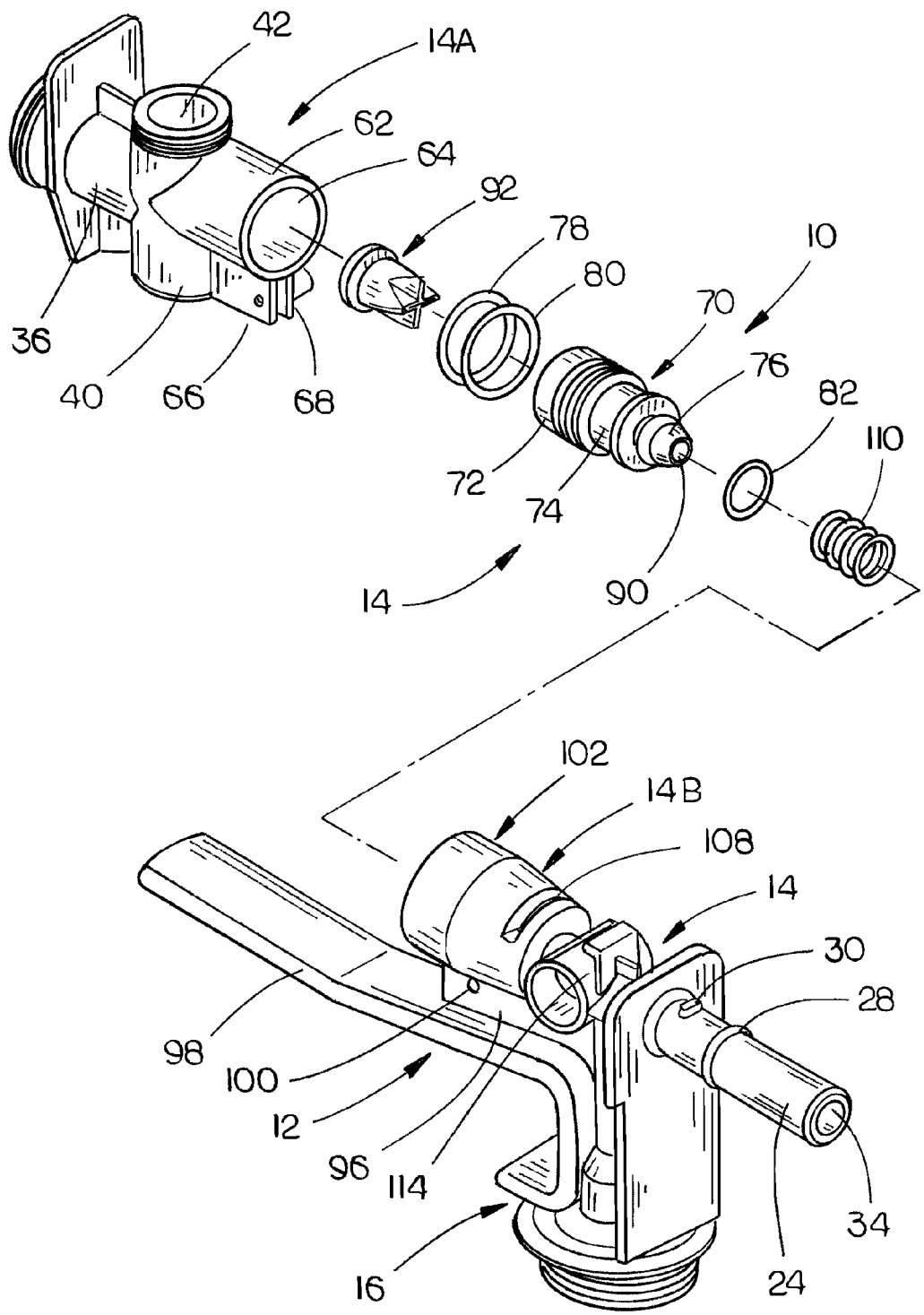
FIG. 4 is a partial exploded perspective view of the hand-held dispenser of this invention.
Figure 5:
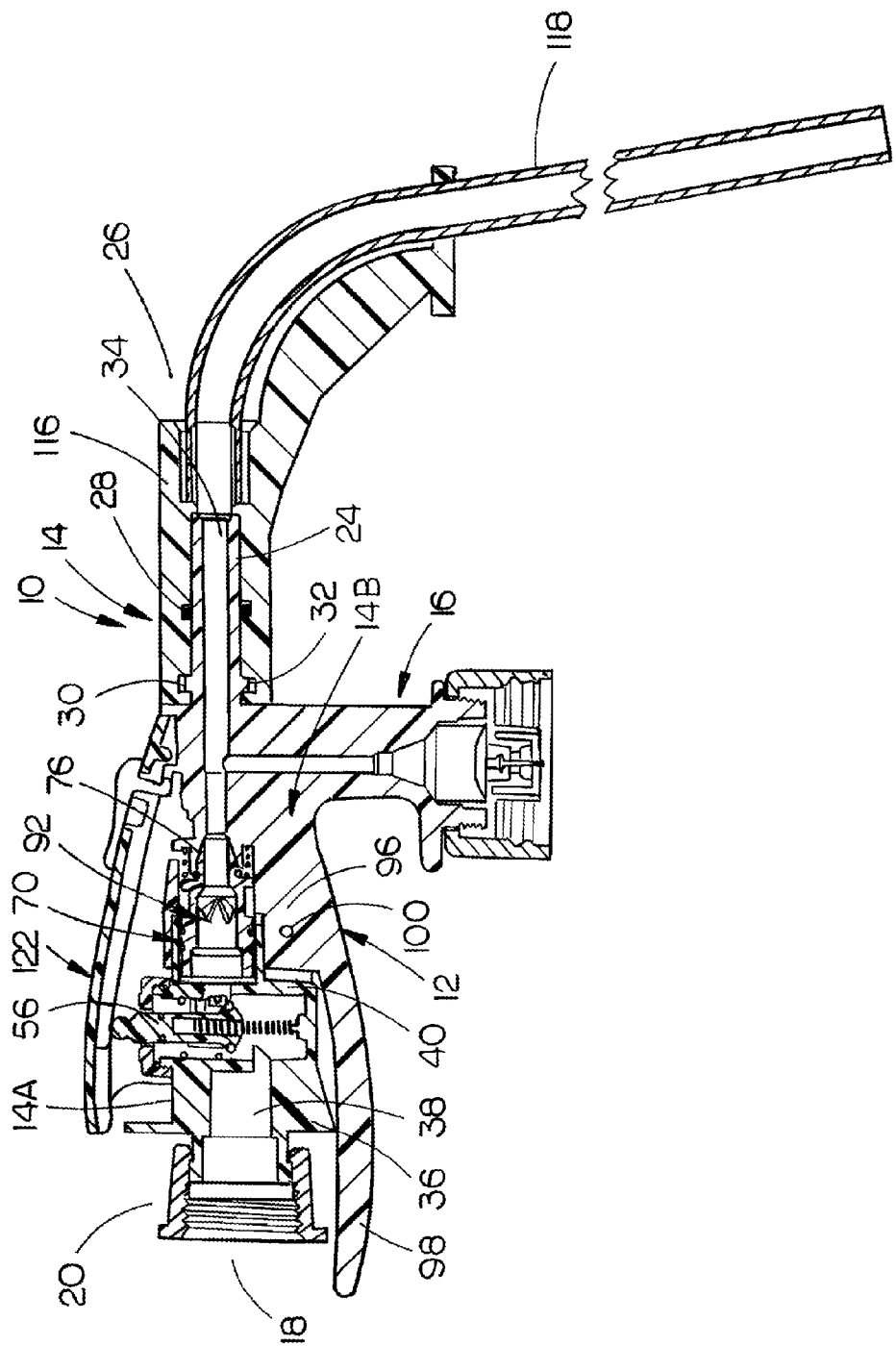
FIG. 5 is a sectional view of the hand-held dispenser of this invention.

Body portion 14 Includes body portions 14A and 14B which are joined together as will be described in more detail hereinafter. Body portion 14A includes an inlet end 18 (FIG. 5) which preferably has a rotatable dispenser nut or connector 20 mounted thereon so that a water hose 22 (FIG. 2) may be secured thereto with the water hose 22 being in communication with a source of water under pressure. It is preferred that a backflow preventer of conventional design be imposed between the water hose 22 and the inlet end 18. An elongated hollow discharge tube 24 is provided at the discharge end 26 of the body portion 14B. Tube 24 may have any type of discharge nozzle selectively removably mounted thereon. A seal ring 28 is mounted on tube 24 as seen in FIG. 4. A pair of oppositely disposed locking lugs 30 and 32 project from tube 24 adjacent the inner end thereof as seen in FIG. 5. Tube 24 has a bore or passageway 34 extending therethrough.

Body portion 14A includes a horizontally disposed cylindrical body member 36 at its inlet end 18 which has a bore or passageway 38 (FIG. 5) extending therethrough. The inner end of body member 36 joins a vertically disposed hollow cylindrical body member 40 having a vertically disposed cylindrical chamber or passageway 42 formed therein. The inner end of bore 38 of body member 36 communicates with a small opening 44 formed in the side wall of body member 40 so that water may flow through passageway 38, through opening 44 and into chamber 42 above the lower end of body member 40. A generally cylindrical valve guide or insert 46 is selectively removably positioned in chamber 42 above the lower end thereof. Valve guide 46 has an annular valve seat 48 formed therein at the lower end thereof which communicates with bore 50 formed in valve guide 46.

The numeral 54 refers to a valve which is designed to seat upon valve seat 48 to close the same. Valve stem 56 extends upwardly through passageway or bore 50 so that the upper end of valve stem 56 is positioned above valve guide 46. Cap 57 is screwed onto the upper end of body member 40. Valve stem 56 extends through an opening in cap 57. Spring 58 yieldably urges valve stem 56 and valve 54 to an upper position so that valve 54 seats upon and closes valve seat 48.

A passageway 60 in body member 40 extends from chamber 42 above valve seat 48. Thus, when valve 54 is seated upon valve seat 48, water cannot pass from chamber 42 into passageway 60. When valve stem 56 and valve 54 are in the lower position, water is free to pass from the chamber 42 into the passageway 60.

Body portion 14A also includes a cylindrical body member 62 which extends transversely from body member 40 and which has a chamber 64 formed therein. The inlet end of chamber 64 communicates with passageway 60 to permit water to pass from chamber 42 into chamber 64 when valve 54 is unseated from valve seat 48. Body member 62 has a pair of spaced-apart mounting plates 66 and 68 positioned on the underside of body member 62 for a purpose to be explained hereinafter.

Figure 6:
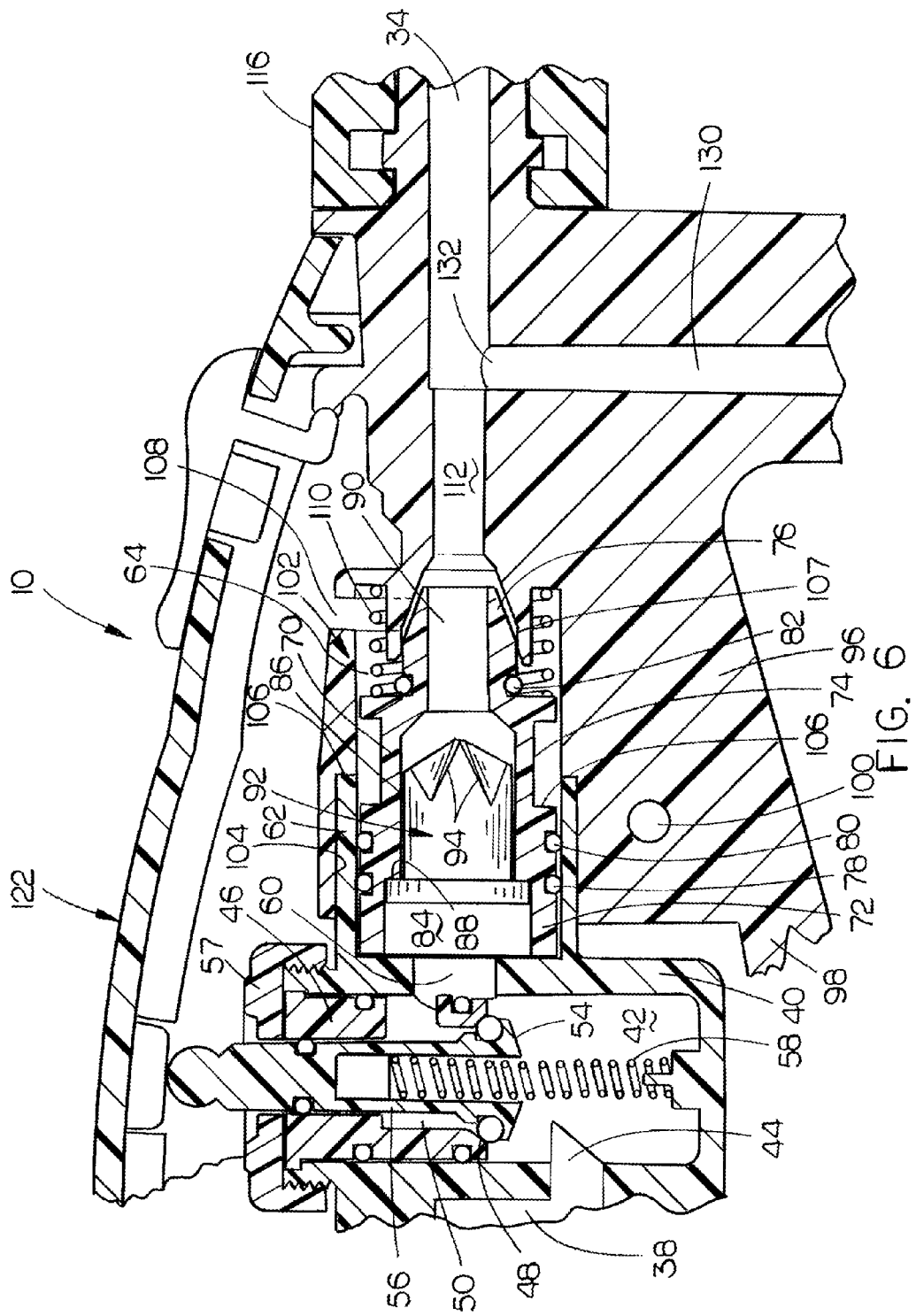
FIG. 6 is a partial sectional view of the hand-held dispenser of this invention.

The numeral 70 refers to a shuttle valve which is slidably mounted in chamber 64 between retracted and extended positions. Shuttle valve 70 includes an outer cylindrical wall portion 72, a cylindrical recessed wall portion 74 and a tapered valve 76 at the discharge end thereof. O-rings 78 and 80 embrace the wall portion 72 as seen in FIG. 6 and an O-ring 82 embraces valve 76 as also seen in FIG. 6. Passageway or bore 84 extends into the inlet end of shuttle valve 70 (FIG. 6). Passageway or bore 86 extends from passageway 84 and has a smaller diameter than passageway 84 to define a shoulder 88 therebetween. The discharge end of passageway 86 tapers inwardly to communicate with the inlet end of a passageway or bore 90 which extends through valve 76.

The numeral 92 refers to a flexible duck-bill cross slot valve having intersecting cross slots 94 at its discharge end. Valve 92 is positioned in passageways 84 and 86 as seen in FIG. 6 and engages shoulder 88 as also seen in FIG. 6. Valve 92 is normally closed but permits pressurized water to pass therethrough from its inlet to discharge ends.

Body member 36, body member 40, body member 62 and plates 68 are integrally molded together to form body portion 14A of body portion 14. Body portion 14A is secured to body portion 14B, as will now be described. A vertically disposed mounting plate 96 extends upwardly from handle 98 of body portion 14B and has a screw opening 100 formed therein. A horizontally disposed cylindrical body member or shroud 102 is secured to the upper end of plate 96. Body member 102 has a central bore or opening 104 extending therethrough which includes a shoulder 106, as seen in FIG. 6. The discharge end of bore 104 has a tapered valve seat 107 which projects towards the inlet end of bore 104. As seen, valve seat 107 has an outside diameter which is less than the inside diameter of body member 102. Body member 102 has a backflow exhaust slot or opening 108 formed therein which communicates with the bore 104. Spring 110 is positioned between the discharge end of body member 102 and shuttle valve 70 (FIG. 6) to yieldably urge shuttle valve 70 to its retracted position. A bore or passageway 112 extends from the discharge side of valve seat 107 to passageway 34 of tube 24. A "blind" socket 114 may be positioned between the discharge end of body member 102 and discharge tube 34.

Socket 114 is only provided by the mold producing body portion 14B so that the socket 114 may be opened to position or spool valve therein if so desired as will be explained hereinafter. The discharge end of passageway 86 is in communication with passageway 112 which is in communication with passageway 34 in tube 24.

A bucket clip 116 is detachably mounted on tube 24 and has a discharge tube 118 mounted thereon which is in communication with tube 24. Body portion 14B is secured to body portion 14A by a screw 120 extending through mounting plate 66, through screw opening 100 and through mounting plate 68. The method of securing body portions 14A and 14B is purely provided for ease of molding.

A valve actuator lever 122 is pivotally secured to body portion 14B at 124 and is in engagement with the upper end of valve stem 56. When lever 122 is depressed to its down or lower "on" position, valve stem 56 will be moved downwardly to unseat valve 54 from valve seat 48. When lever 122 is in its upper or "off" position, spring 58 will urge valve stem 56 and valve 54 upwardly to seat valve 54 onto valve seat 48.

When it is desired to mix liquid chemicals to the water to be discharged from dispenser 10, a chemical container 126 is secured to the connector 128 at the lower end of body portion 16. Prior to lever 122 being moved from its upper "off" position, to its lower "on" position, spring 110 will yieldably urge shuttle valve 70 to its retracted position. With shuttle valve 70 being in its retracted position, the duck-bill valve 92 will be closed and the discharge tube 24 will be in communication with the atmosphere by way of the slot or opening 108 since valve 76 will be unseated from valve seat 107 so that any backflow into discharge 24 will be exhausted to the atmosphere by way of the opening 108.

When lever 122 is pivotally moved from its "off" position to its "on" position, the pressurized water will open the discharge end of the duck-bill valve 92 and will move shuttle valve 70 to its extended position against the yieldable force of spring 58 whereby valve 76 will seat upon valve seat 107 so that the water will flow through passageway 112 into passageway 34 of tube 24. As the water passes the upper end of passageway 130 in body portion 16, a venturi will be created at 132 to draw the liquid chemical in container 120 into passageway 34 of tube 24 to mix with the water. Should the discharge end of the dispenser 10 be subjected to a backflow problem, the backflow pressure will close valve 92 and the spring 110 will move the shuttle valve 70 from its extended position to its retracted position so that the backflow will be exhausted to the atmosphere by way of the slot or opening 108. If the source of water should be interrupted by a water line break, etc., a suction is created at the inlet end of the shuttle valve 70 which will close duck-bill valve 92 and also will cause shuttle valve 70 to move to its retracted position. The spring 110 also urges the shuttle valve 92 to move to its retracted position. With duck-bill valve 92 closed and shuttle valve 70 is in its retracted position, any chemical in the discharge end of the dispenser will be exhausted to the atmosphere by way of the opening 108. Thus, even if the spring 110 should somehow fail, the duck-bill valve 92 will be closed and the shuttle valve 92 will be in its retracted "exhaust" position.

Figure 7:
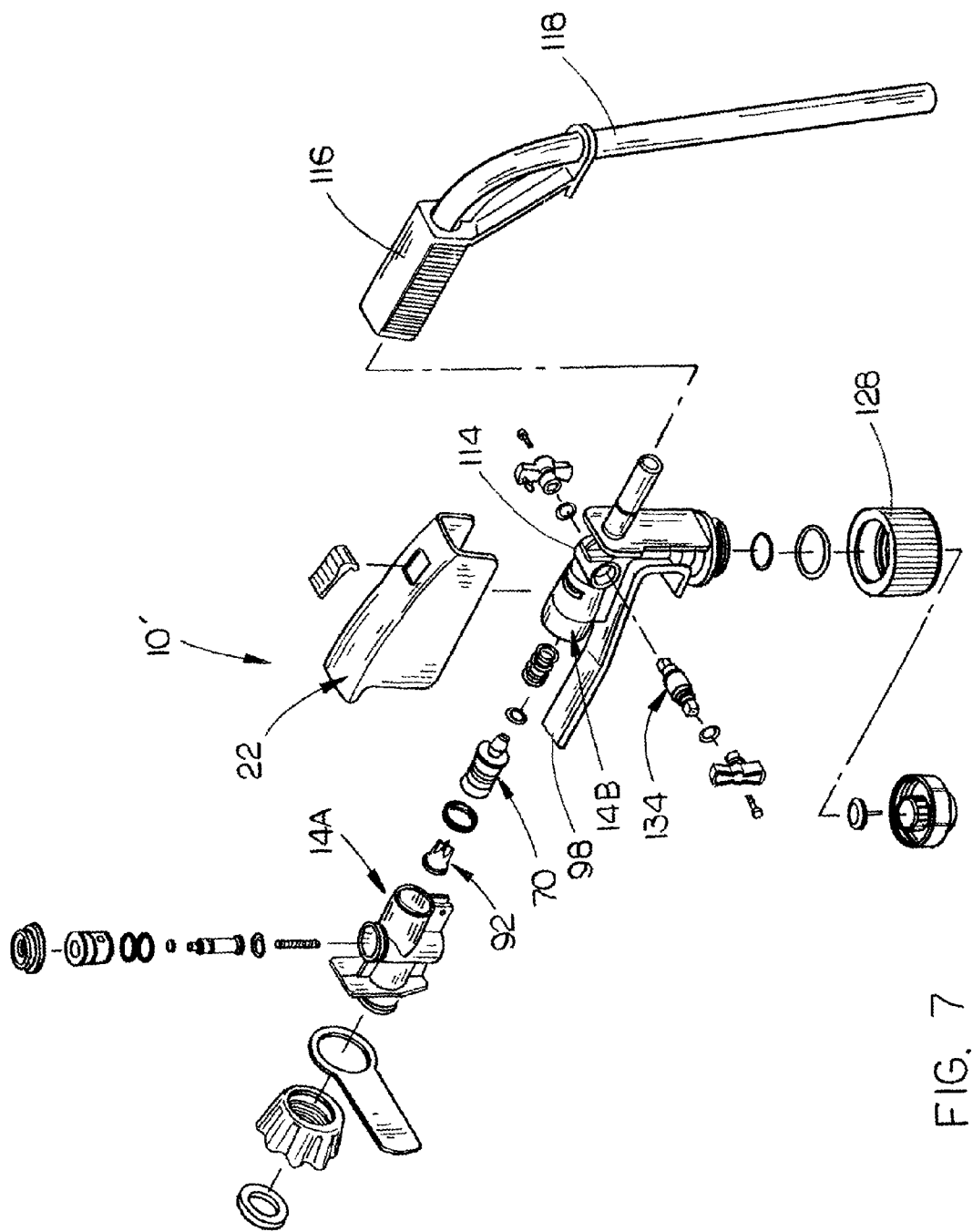
FIG. 7 is an exploded perspective view of a modified form of the hand-held dispenser of this invention.
Figure 8:
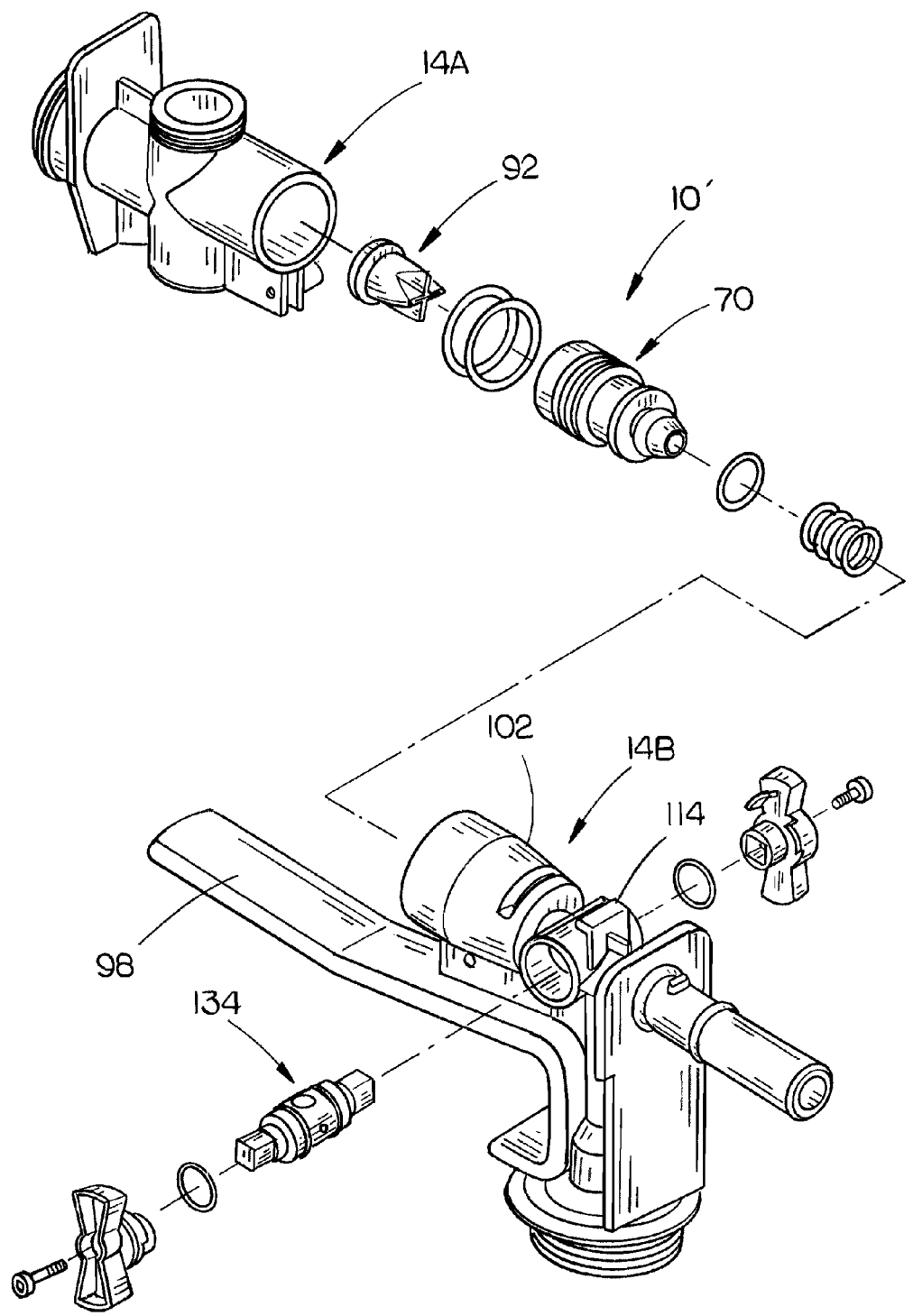
FIG. 8 is a partial exploded perspective view of the hand-held dispenser of FIG. 7.

FIGS. 7 and 8 illustrate a slight modification of the dispenser of this invention and which is designated by the reference numeral 10'. The only difference between dispenser 10 and the dispenser 10' is that a spool valve 134 is rotatably mounted in the modified socket 114' to permit the rate of water flow therethrough to be controlled.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A hand-held dispenser apparatus for controlling the flow of water therethrough and for injecting a liquid chemical into the water passing through the apparatus, comprising:
   a generally horizontally disposed first body portion having an inlet end and a discharge end;
   a generally vertically disposed second body portion, having upper and lower ends, extending downwardly from said first body portion;
   said lower end of said second body portion being configured to be secured to a liquid chemical container;
   said first body portion having a generally horizontally disposed first body member which extends from said inlet end of said first body member towards said discharge end thereof;
   said first body member having an inlet end and a discharge end;
   said first body member having a horizontally disposed first fluid passageway formed therein which extends from said inlet end thereof towards said discharge end thereof;
   said first fluid passageway having an inlet end and a discharge end;
   said inlet end of said first fluid passageway adapted to be placed in communication with a source of water under pressure;
   said first body portion having a generally vertically disposed second body member positioned at said discharge end of said first body member with said second body portion having upper and lower ends;
   said second body member having a generally vertically disposed cylindrical chamber formed therein which has an inlet end and a discharge end;
   a cap selectively closing the upper end of said second body portion;
   said second body member having an annular first valve seat provided in said chamber between said inlet and discharge ends thereof;
   said first valve seat having an inlet side and a discharge side;
   said inlet side of said first valve seat being in communication with said discharge end of said first fluid passageway;
   a first valve selectively vertically movably mounted in said chamber;
   said first valve including a valve member positioned below said valve seat and a valve stem, having upper and lower ends, secured to said valve member which extends upwardly therefrom through said valve seat, said chambers and said cap;
   said first valve being selectively vertically movable between a lower position to an upper position;
   a spring in said chamber which yieldably urges said first valve to its said upper position;
   said valve member of said first valve closing said first valve seat when said first valve is in its said upper position;
   said valve member of said first valve, when said first valve is in its said lower position, permitting the flow of water from said first passageway through said first valve seat and upwardly into said chamber;
   a valve actuating lever pivotally secured to said first body portion which is operatively connected to said upper end of said valve stem of said first valve;
   said valve actuating lever being pivotally movable from an upper "off" position wherein said first valve is in its said upper position to a lower "on" position wherein said valve member of said first valve is unseated from said first valve seat;
   said first body portion having a horizontally disposed second passageway, having inlet and discharge ends, formed therein which extends from said chamber, above said valve seat, towards said discharge end of said first body portion;
   said first body portion including a horizontally disposed tubular third body member, having inlet and discharge ends, extending from said second body member towards said discharge end of said first body portion;
   said inlet end of said third body member being in fluid communication with said chamber above said valve seat;
   said first body portion including a fourth body member having an inlet end and a discharge end;
   said discharge end of said third body member being received by said inlet end of said fourth body member;
   said fourth body member having a tapered second valve seat therein, having inlet and discharge ends, which is spaced from said discharge end of said third body member;
   said fourth body member having a backflow exhaust opening formed therein adjacent said discharge end thereof which is in communication with the atmosphere;
   a shuttle valve having an inlet end and a discharge end;
   said shuttle valve having a tapered valve at its said discharge end;
   said shuttle valve having a first passageway formed therein which has an inlet end and a discharge end;
   said tapered valve having a central opening extending therethrough which is in communication with said first passageway thereof;
   a flexible duck-bill valve having an open inlet end and a normally closed discharge end;
   said duck-bill valve being positioned in said first passageway of said shuttle valve;
   said discharge end of said duck-bill valve being in communication with said central opening in said tapered valve;
   said shuttle valve being movably positioned in said third and fourth body members;
   said shuttle valve being movable between extended and retracted positions relative to said third and fourth body members;
   a spring in said fourth body member which yieldably urges said shuttle valve to its said retracted position;
   said tapered valve, when said shuttle valve is in said extended position, seating into said second valve seat in said fourth body member whereby water passing from said discharge end of said duck-bill valve will pass through said discharge end of said fourth body member;

said tapered valve, when said shuttle valve is in said retracted position, which is caused by said spring and/or backflow pressure, being unseated from said second valve seat whereby the interior of said fourth body member is in communication with the atmosphere by way of said back-flow opening in said fourth body member;

said first body portion having a discharge passageway formed therein which extends from said discharge end of said second valve seat to said discharge end of said first body portion;

said second body portion having a suction passageway, having upper and lower ends, extending upwardly therethrough;

said lower end of said suction passageway being in communication with the interior of the chemical container;

said upper end of said suction passageway being in communication with said discharge passageway of said first body portion whereby water passing through said discharge passageway will draw liquid from the container by way of said suction passageway into the water being discharged from the dispenser.

2. The hand-held dispenser of claim 1 wherein pressurized water extending through said first body portion causes said shuttle valve to move to its said extended position thereby closing said back-flow opening.

3. The hand-held dispenser of claim 1 wherein backflow suction at said inlet end of said shuttle valve causes said shuttle valve to move to its retracted position and causes said discharge end of said duck-bill valve to be closed thereby opening said backflow opening.

4. A dispenser apparatus for controlling the flow of water therethrough and for injecting a liquid chemical into the water passing through the apparatus, comprising:
   a housing having an inlet end and a discharge end;
   said housing having a first bore formed therein which has inlet and discharge ends;
   a shuttle valve, having an inlet end and a discharge end, slidably movably mounted in said first bore between extended and retracted positions;
   said discharge end of said shuttle valve having a valve member thereon;
   said shuttle valve having a first passageway formed therein which has an inlet end and a discharge end;
   said inlet end of said first passageway of said shuttle valve being adapted to be placed in communication with a source of water under pressure;
   a valve seat in said housing having an inlet end and a discharge end;
   said housing having a second passageway formed therein which extends from said discharge side of said valve seat towards said discharge end of said housing;
   a spring in said housing which yieldably urges said shuttle valve towards its said retracted position;
   said shuttle valve, when in its said extended position, causing said valve member to seat onto said valve seat;
   said shuttle valve, when in its said retracted position, causing said valve member to unseat from said valve seat;
   said housing having a third passageway which extends from said second passageway to a source of liquid chemical;
   said housing being configured whereby said bore will be in communication with the atmosphere when said valve member is unseated from said valve seat.

* * * * *